United States Patent [19]

Yamamuro

[11] Patent Number: 5,063,549
[45] Date of Patent: Nov. 5, 1991

[54] OPTICAL DISK APPARATUS

[75] Inventor: Mikio Yamamuro, Kawasaki, Japan

[73] Assignee: Kabushiki Kaisha Toshiba, Kawasaki, Japan

[21] Appl. No.: 371,052

[22] Filed: Jun. 26, 1989

[30] Foreign Application Priority Data

Jun. 30, 1988 [JP] Japan ............................... 63-163971

[51] Int. Cl.$^5$ .............................................. G11B 7/00
[52] U.S. Cl. ............................. 369/44.28; 369/44.29; 369/32; 369/44.32
[58] Field of Search .................. 369/44.28, 44.29, 32, 369/59, 54, 44.32

[56] References Cited

U.S. PATENT DOCUMENTS

| | | | |
|---|---|---|---|
| 4,607,358 | 8/1986 | Maeda et al. | 369/44.28 |
| 4,615,023 | 9/1986 | Inada et al. | 369/44.28 |
| 4,901,299 | 2/1990 | Nakatsu | 369/44.28 |

Primary Examiner—Roy N. Envall, Jr.
Assistant Examiner—Hindi Nabil
Attorney, Agent, or Firm—Finnegan, Henderson, Farabow, Garrett and Dunner

[57] ABSTRACT

An optical disk apparatus detects the speed of movement a laser beam gathered and focused by an objective lens from an optical disk. In a coarse access mode, speed control data is read out of a speed control table based upon the number of tracks corresponding to the difference between the present track and a target track. A linear motor, or an optical head coupled with the motor, is then moved in accordance with a difference between the present speed signal as detected and the speed control signal as read out. In a fine access mode, an objective contained in the optical head is moved in accordance with a difference between the present speed signal and the speed control signal.

9 Claims, 6 Drawing Sheets

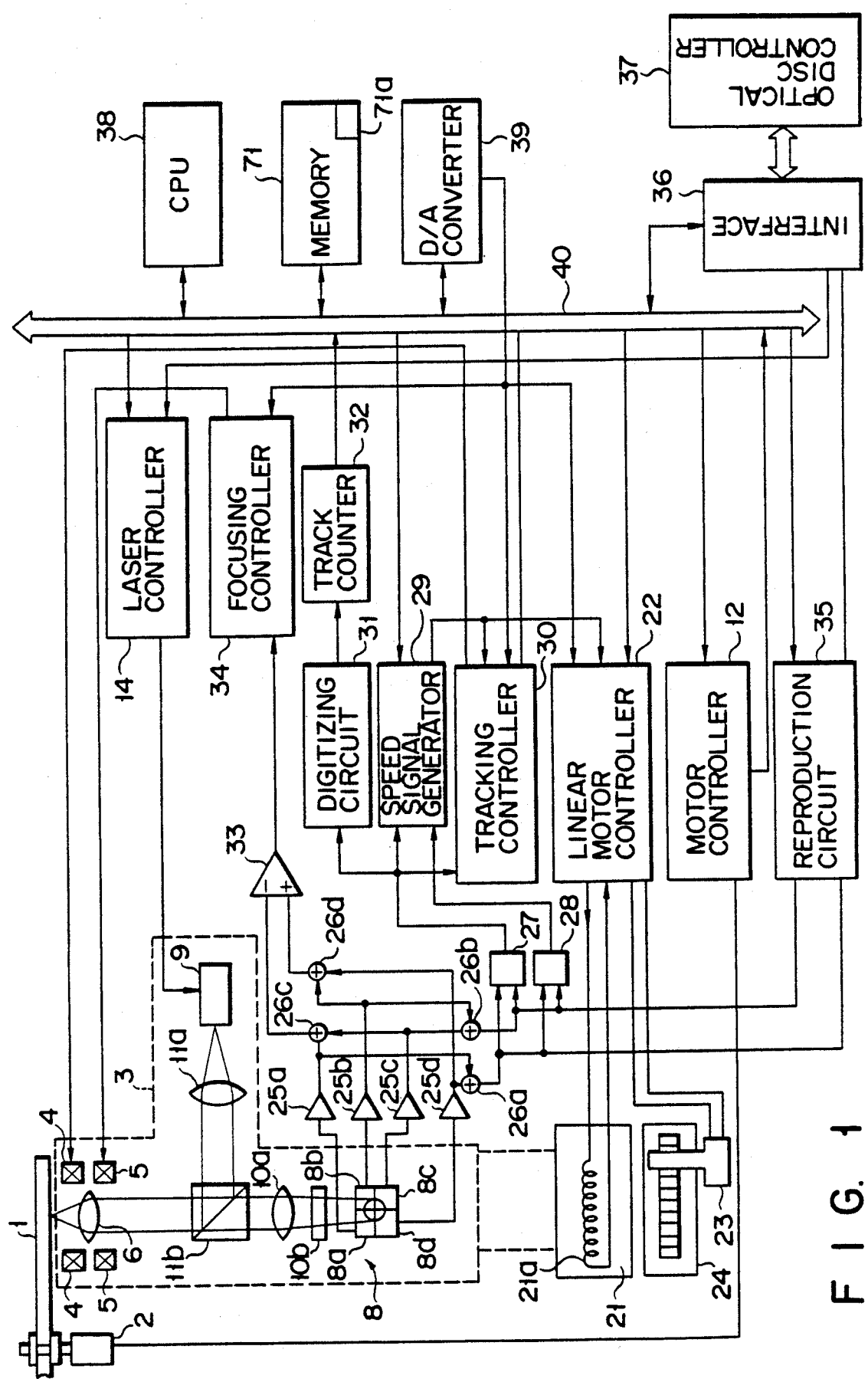
F I G. 1

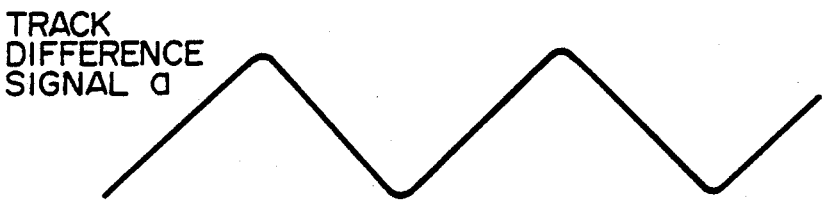
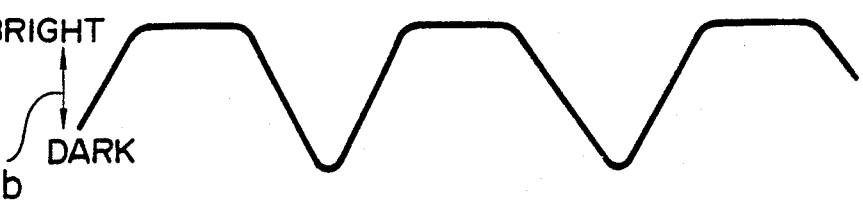
FIG. 4A
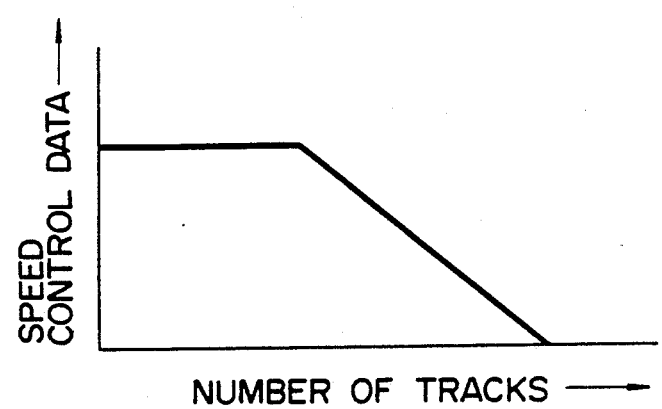
FIG. 4B
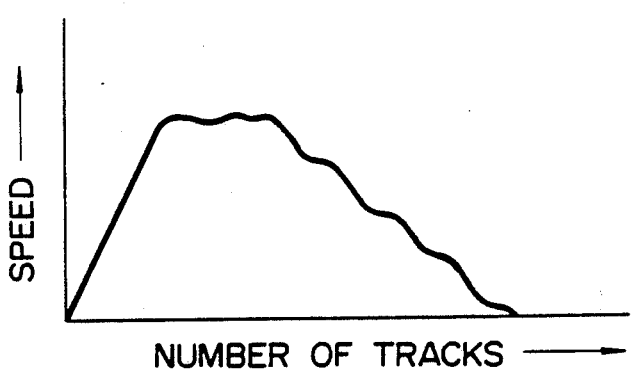

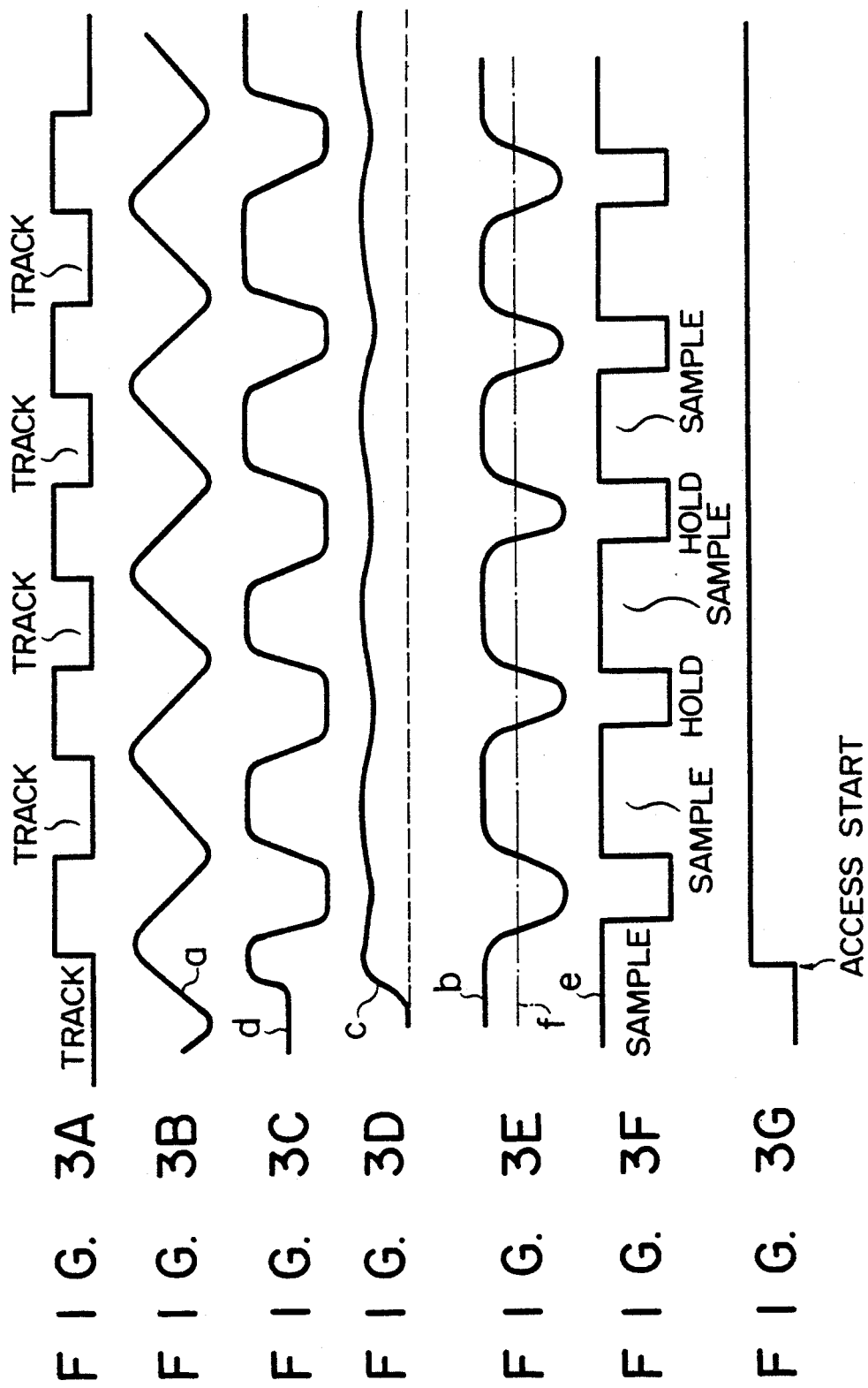

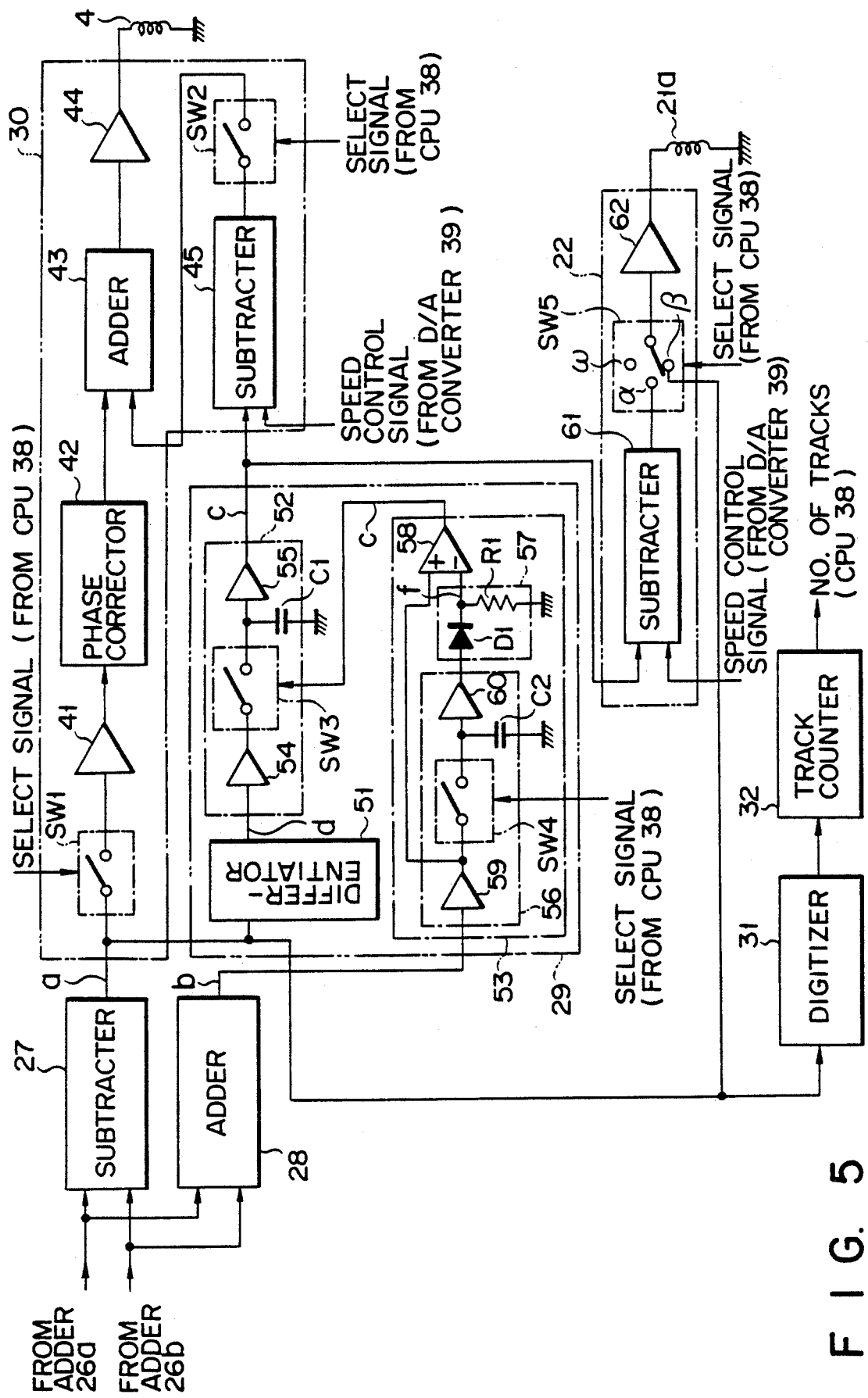
F I G. 5

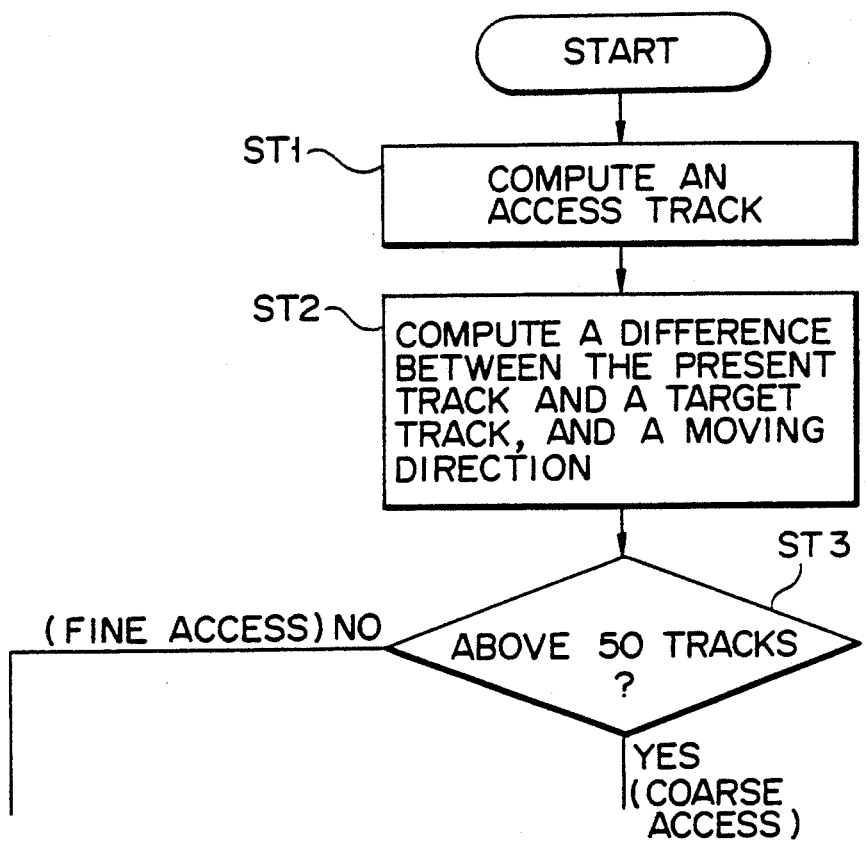
F I G. 6A

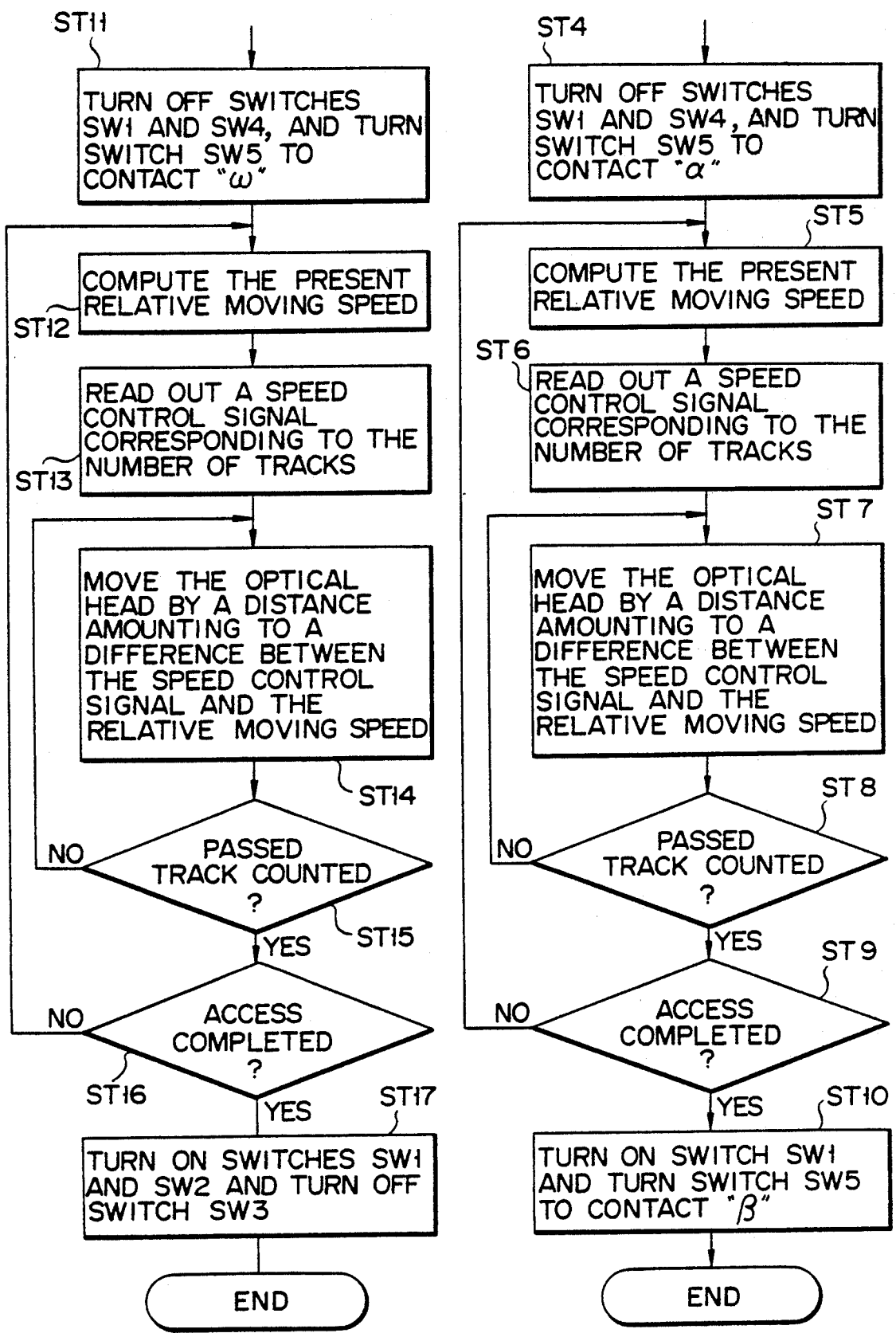
F I G. 6B

OPTICAL DISK APPARATUS

BACKGROUND OF THE INVENTION

1. Field of the Invention

The present invention relates to an optical disk apparatus, and more particularly to an optical disk apparatus for optically recording and reading out data to and from tracks on a rotating optical disk by moving an optical head relative to the rotating optical disk.

2. Description of the Related Art

Generally, an image filing system uses an optical disk apparatus. The optical disk apparatus contains an optical disk on which tracks are spirally or coaxially formed. Data is optically recorded and read out to and from the tracks of the optical disk. In the recordinq and reading of the data, the optical disk is rotated and an optical head is moved above and relative to the rotating optical disk.

In a record mode, an original is optically and two dimensionally scanned to read the pictorial information on the original. The optical pictorial information is then converted into corresponding electrical image data. The electrical image data is optically recorded into the tracks of the optical disk by means of an optical head. In a retrieval mode, the recorded data is retrieved by the optical head, and is reproduced in the form of a hard copy or a soft copy.

In the optical head, which is placed close to the surface of the rotating optical disk, a laser beam outputted from a semiconductor laser oscillator is focused on the optical disk by means of an objective lens when data is recorded or reproduced. In the tracking control mode of control of the optical head, the laser beam gathered by the objective traces a track on the optical disk. In the focus control mode, the laser beam is focused on the traced track of the optical disk by means of the objective.

The optical disk apparatus is provided with a linear motor to radially move the optical head across an optical disk in a coarse access mode, and an objective lens drive mechanism for driving the objective lens in a fine access mode.

To access a desired track of the optical disk by a laser beam, the coarse mode is first set up to drive the linear motor and consequently to move the optical head in the radial direction of the optical disk. In this mode, the track is coarsely accessed.

A position of the accessed track on the optical disk is read by the laser beam. If a difference between the read track position and a target track position is small and within a tolerable range, the coarse access mode is switched to the fine access mode. In the fine access mode, the objective is discretely moved toward a desired track by a lens actuator. If the difference is large, the coarse access mode is maintained and the linear motor is driven again to make a rough access to the desired track.

In the coarse access mode, a position detector detects an optical distance scale associated with the optical head, thereby to obtain the position of the optical head and hence the distance that the optical head has moved. A magnetic sensor installed at the linear motor checks the moving direction of the optical head.

In the fine access mode, the number of the tracks crossed by the laser beam collected by the objective lens is counted. By using the count, a moving distance of the objective lens is obtained. The moving direction of the objective lens is checked by the value of a current applied to the lens actuator.

In the optical disk apparatus thus arranged and operated, an eccentricity essentially exists in the optical disk mechanism. The eccentricity creates problems in the access operations. In the coarse access mode, when the optical head reaches a location just before the accessed position and is at a low speed, the eccentricity possibly degrades an accuracy of the access. In the fine access mode, the eccentricity frequently leads to a mistaken recognition of the moving direction as a reverse direction.

SUMMARY OF THE INVENTION

Accordingly, an object of the present invention is to provide an optical disk apparatus which, in a coarse access mode, exactly detects a relative movement of an optical head relative to an optical disk, thereby improving the accuracy of a coarse access, and in a fine access mode, exactly detects a movement of an objective lens relative to the optical disk, thereby to reduce the access time.

According to one aspect of the present invention, there is provided an optical disk apparatus comprising: an optical head including focusing means for focusing a laser beam onto an optical disk having tracks thereon, and detecting means for detecting a laser beam reflected from the tracks of the optical disk; moving means for moving the focusing means in a direction orthogonal to the axis of the laser beam; even signal generating means for generating a tracking error signal for a track of the optical disk in accordance with a detect signal from the detecting means; movement signal generating means responding to a tracking error signal received from the generating means to cause the focusing means to be move by the moving means and the focusing means to move to a target track on the optical disk; speed detecting means for detecting the speed of the relative movement between the laser beam applied through the focusing means and the optical disk; processing means for making an access calculating on the basis of the difference in location between the target track and a present track where the focusing means is currently positioned; memory means for storing speed control data corresponding to the number of tracks that the focusing means has passed in the access operation; and control means operating such that the control means stops the movement of the focusing means when the access calculation is performed by the processing means, and the moving means moves the focusing means to the target track in response to a signal from the detecting means and a speed control data signal that corresponds to the number of tracks to be accessed and is read out from the memory means.

According to another aspect of the present invention, there is provided an optical disk apparatus comprising an optical head including focusing means for focusing a laser beam onto an optical disk having tracks thereon, and detecting means for detecting a laser beam reflected from the tracks of the optical disk; first moving means for moving the focusing means in a direction orthogonal to the axis of the laser beam; second moving means for moving the optical head in a radial direction of the optical disk; generating means for generating a tracking error signal in accordance with a signal from the detecting means; movement signal generating means responding to a tracking error signal to move the focusing means by the first moving means and causing the focusing means to move to a target track on the optical disk; second detecting means for detecting the speed of relative movement between the laser beam applied through the focusing means of the optical head and the optical disk; calculating means for making an access calculation on the basis of a position difference between the target track and the present track where the focusing means is currently positioned; memory means for storing speed control data corresponding to the number of tracks that the focusing means passed in the access operation; and control means operating such that the control means stops the movement of the focusing means when the access processing is performed by the processing means, and moves the optical head to the target track by the second moving means in response to a signal from the detecting means and a speed control data signal that corresponds to the number of tracks to be accessed and is read out from the memory means.

According to another aspect of the present invention, there is provided an optical disk apparatus comprising an optical head including focusing means for focusing a laser beam onto an optical disk having tracks thereon, and detecting means for detecting a laser beam reflected from the laser beam; moving means for moving the focusing means in a direction orthogonal to the axis of the laser beam; first generating means for generating a tracking error signal in accordance with a signal from the detecting means; second generating means for generating in accordance with a signal from the detect means a high level signal when the laser beam is positioned above a track on the optical disk, and a low level signal when the laser beam is positioned between the adjacent tracks on the optical disk; differentiating means for differentiating a tracking error signal from the first generating means; timing signal generating means for generating a timing signal by using an output signal of the second generating means; and means for sampling and holding a differentiated signal from the differentiating means in response to a timing signal from the timing signal generating means, and outputting the sampled and held signal as a signal representative of the relative speed of the the optical disk and the focusing means.

BRIEF DESCRIPTION OF THE DRAWINGS

FIG. 1 is a block diagram showing an optical disk apparatus according to an embodiment of the present invention;

FIGS. 2A to 2C show waveforms of signals including a track difference signal and a sum signal;

FIGS. 3A to 3G show waveforms of signals at key points in the circuit of FIG. 1;

FIG. 4A shows a profile of speed control data vs. number of passed tracks that are stored in a table of a memory used the FIG. 1 circuit;

FIG. 4B shows a profile of a speed signal outputted from a speed signal generator in the FIG. 1 circuit;

FIG. 5 is a circuit diagram showing a tracking control circuit and a linear motor controller, which are contained in the FIG. 1 circuit; and FIGS. 6A and 6B form a flowchart showing an access operation by the FIG. 1 circuit.

DETAILED DESCRIPTION OF THE PREFERRED EMBODIMENTS

FIG. 1 shows in block form an optical disk apparatus according to an embodiment of the present invention.

An optical disk 1 shown in FIG. 1 has spiral or coaxial grooves or tracks (not shown) formed thereon. The optical disk 1 is rotated at a fixed speed of 1800, rpm, for example, by a motor 2. The motor 2 is controlled by a motor controller 12.

The optical disk 1 consists of a circular plate whose surface is coated with a metal film layer in a doughnut fashion. The circular plate has a diameter of 5.25 inches (approximately 13.3 cm) and is made of plastic or glass. The metal film layer as a recording film is made of tellurium or bismuth.

The doughnut shaped recording surface is divided into a plurality of sectors, with a reference mark. The recording surface contains 36,000 tracks and 300,000 blocks. Data of variable length are recorded in those blocks in the tracks on the recording surface.

A block header as master preformat data is recorded at the head of each block. The block header is recorded at the start position of each block as a unit of data recording, and contains a block number and a track number.

An optical head 3 is placed under and close to the optical disk 1. The optical head 3, comprises an objective 6, drive coils 4 and 5 for driving the objective 6, photo detector 8, semiconductor laser 9, condensing lens 10a, cylindrical lens 10b, collimator lens 11a for collimating laser beams emitted by the semiconductor laser 9, and half-prism 11b. For the details of the optical system, reference is made to U.S. Pat. No. 4,684,797.

The objective 6 is suspended from a fixing means (not shown) by means of a wire suspension. The objective 6 is moved in the focusing direction or along an optical axis of the objective 6 by means of the drive coil 5, and is moved in the tracking direction or the direction orthogonal to the optical axis of the objective 6 by means of drive coil 4.

The optical head 3 is fixed to a drive coil 21a as a movable part of a linear motor 21. The drive coil 21a is connected to a linear motor controller 22. The linear motor driver 22 is connected to a linear motor position detector 23. The linear motor position detector 23 detects an optical scale 24 provided on the optical head 3 and produces a position signal.

A permanent magnet is provided in a fixed part of the linear motor 21. The linear motor controller 22 energizes the drive coil 21a and the linear motor is driven. When the linear motor 21 is driven, the optical head 3 is moved in the radial direction of the optical disk 1.

In the optical head 3, the objective 6 is supported by a wire or a plate spring (not shown). The drive coil 5 moves the objective 6 in the focusing direction (the direction of the optical axis of the lens). The drive coil moves the same in the tracking direction (the direction orthogonal to the optical axis of the lens).

The semiconductor laser 9 emits laser beams under control of the laser controller 14. The laser beam emitted passes through the collimator lens 11a, half-prism 11b, and objective 6, and hits the recording surface of the optical disk 1. The laser beam reflected on the optical disk 1 passes through the objective 9, half-prism 11b, condensing lens 10a, and cylindrical lens 10b and reaches the photo detector 8.

The photo detector 8 consists of four divided optical sensing cells 8a through 8d.

The output signal of the cell 8a of the photo detector 8 is applied to the first inputs of adders 26a and 26c, by way of an amplifier 25a. The output signal of the cell 8b of the photo detector 8 is applied to the first inputs of adders 26b and 26d, by way of an amplifier 25b. The output signal of the cell 8c of the photo detector 8 is applied to the second inputs of adders 26b and 26c, by way of an amplifier 25c. The output signal of the cell 8d of the photo detector 8 is applied to the second inputs of adders 26a and 26d, by way of an amplifier 25d.

The output signals of the adders 26a and 26b are respectively supplied to a subtracter 27 and an adder 28. The subtracter 27 forms a track difference signal "a" (FIGS. 2B and 3B) in accordance with a difference between the output signals of the adders 26a and 26b. The adder 28 forms a sum signal "b" representing the sum of the output signals of the adders 26a and 26b. As shown in FIGS. 2A, 2B, 3A and 3B, the inclination of the track difference signal "a" is positive when the laser beam is positioned above the track on the optical disk 1. When it is positioned between the tracks, the inclination of the signal is negative. As shown in FIGS. 2A, 2C, 3A and 3E, the sum signal "b" is in a high level when the laser beam is positioned above the track. When the laser beam is between the adjacent tracks, it is in a low level.

The track difference signal "b" produced by the subtracter 27 is applied to a speed signal generator 29, tracking controller 30, and digitizing circuit 31. The sum signal "b" produced by the adder 28 is outputted to a speed signal generator 29.

In accordance with the track difference signal "a" from the subtracter 27 and the sum signal "b" from the adder 28, the speed signal generator 29 produces a speed signal "c" representing a true relative moving speed of the objective 6 and the optical disk 1. See FIGS. 3D and 4B. The speed signal "c" from the speed signal generator 29 is supplied to the linear motor controller 22 and the tracking controller 30.

The tracking controller 30 produces a track drive signal in accordance with the track difference signal "a" from the subtracter 27, the speed signal "c" from the speed signal generator 29, and a speed control signal from a D/A converter 39. The track drive signal of the tracking controller 30 is supplied to the drive coil 4.

The digitizing circuit 31 produces a digitized signal in accordance with the track difference signal "a" supplied from the subtracter 27. The digitized signal of the digitizing circuit 31 is supplied to a track counter 32.

The track counter 32 counts the digitized signal from the digitizing circuit 31, viz., the number of tracks that the optical head 3, more exactly the laser beam from the objective 6, passed in the access operation.

The output signal of the adder 26c is supplied to the inverting input terminal of a differential amplifier 33. The noninverting input terminal of the amplifier 33 is coupled for reception with an output signal of the adder 26d. The differential amplifier 33 supplies to a focusing controller 34 a signal representative of a focal point that depends on a difference between the output signals of the adders 26c and 26d. The output signal of the focusing controller 34 is supplied to a drive coil 5 for focusing. As a result, the laser beam is always just focused on the optical disk 1.

Thus, in the focusing and tracking modes, the sum signal concerning the output signals of the photo sensing cells 8a to 8d of the photo photo detector 8, viz., the output signals of the adders 26a and 26b, contains the information of depressions in the tracks, which represent the recorded data in the form of pits. This signal is supplied to a reproduction circuit 35. Upon reception of the signal, the reproduction circuit 35 reproduces image data, and address data containing track numbers and sector numbers.

The laser controller 14, focusing controller 34, tracking controller 30, linear motor controller 22, motor controller 12, reproduction circuit 35, track counter 32, speed signal generator 29, interface 36, and the like are all connected through a bus line 40 to a CPU 38. The CPU 38 is controlled by a program stored in a memory 71.

The interface 36 allows the transfer of a track number of a track to be accessed by the optical disk controller 37 to the CPU 38, transfer of the recording data to the laser controller 14, and outputting of the video signal to be reproduced by the reproduction circuit 35 to the optical disk controller 37.

The memory 71 contains a speed control table for storing speed control data representing the numbers of tracks to be passed in the coarse access mode and the fine access mode, that has a profile as shown in FIG. 4A.

A D/A converter 39 is used when data is transferred between the focusing controller 34, tracking controller 30, linear motor controller 22, and CPU 38.

The details of the linear motor controller 22, speed signal generator 29, and track controller 30 will be described with reference to in FIG. 5.

In the tracking mode, the tracking controller 30 forms a track drive signal by using a track difference signal "a" derived from the subtracter 27. In the fine access mode, the controller 30 forms a track drive signal by using a speed control signal from the D/A converter 39 and a speed signal "c" from the speed signal generator 29.

The tracking controller 30 is made up of select switches SW1 and SW2, buffer 41, phase corrector 42, adder 43, driver 44, and subtracter 45.

A track difference signal "a" from the subtracter 27 is supplied to the switch SW1. The CPU 38 turns on the switch SW1 in the tracking mode, and turns it off in the coarse access mode and the fine access mode. The output signal of the switch SW1, i.e., the track difference signal "a", is supplied through the buffer 41 to the phase corrector 42. The phase corrector 42 corrects the phase of the track difference signal coming from the buffer 41, and supplies the phase corrected signal to the adder 43.

The subtracter 45 subtracts a speed signal "c" produced by the speed signal generator 29 from the speed control signal coming from the D/A converter 39. The result of the subtraction that is outputted from the subtracter 45 is applied to the adder 43 via the switch SW2. Under control of the CPU 38, the switch SW2 is turned on in the fine access mode, and turned off in the coarse access mode and in the tracking mode.

The adder 43 adds together a signal from the phase corrector 42 and a signal from the switch SW2, and transfers the sum signal to the driver 44. The driver 44 drives the drive coil 4 in accordance with a signal supplied from the adder 43.

In the tracking mode, the adder 43 supplies only the signal from the phase corrector 42 to the driver 44. In the fine access mode, the adder supplies the sum of it and the signal from the switch SW2 to the driver 44.

The speed signal generator 29 detects a time duration that the laser beam is positioned above a track, in the coarse access mode and the fine access mode. For the detection, a sum signal "b" from the adder 28 is used. A true signal "c" is generated by using a track difference signal "a" from the subtracter 27 that is produced during this detection period. The speed signal generator 29 comprises a differentiating circuit 51, a sample/hold circuit 52, and a timing signal generator 53.

A track difference signal "a" from the subtracter 27 is supplied to the differential circuit 51. The circuit 51 differentiates the signal "a" to obtain a speed signal "d". The signal "d" is supplied to the sample/hold circuit 52. The sample/hold circuit 52 samples the speed signal "c" from the differentiating circuit 51 in response to a timing signal "e" (FIG. 3F) from the timing signal generator 53, and holds the sampled signal. The sample/hold circuit 52 is made up of buffers 54 and 55, select switch SW3, and capacitor C1.

To be more specific, the speed signal "d" from the differentiating circuit 51 is supplied through the buffer 54 to the switch SW3. The on and off of the switch SW3 are controlled by the timing signal "e" from the timing signal generator 53. The output signal from the switch SW3, i.e., the speed signal "d" (sampled value), is held by the capacitor C1. A voltage value held in the capacitor C1 is supplied as a true speed signal "c" to the subtracter 45 in the tracking controller 30 and the subtracter 61 in the linear motor controller 22.

By using the sum signal "b" from the adder 28, the timing signal generator 53 generates a signal in a high level when the laser beam is positioned above a track, and a signal in a low level when it is between the adjacent tracks. The timing signal generator 53 is made up of a sample/hold circuit 56, level shift circuit 57, and comparator 58.

The sum signal "b" from the adder 28 is supplied through a buffer 59 to a select switch SW4 and the noninverting input terminal of the comparator 58. Under control of the CPU 38, the switch SW4 is turned on in the tracking mode, and turned off in the coarse mode and the fine mode. The output signal of the switch SW4, i.e., the sum signal "b" in a high level, is held by a capacitor C2, and is applied through a buffer 60 to the level shift circuit 57.

The level shift circuit 57 is made up of a diode D1 and a resistor R1. The level shift circuit 57 produces a reference signal "f" as the high level sum signal "b" shifted by a predetermined level. See FIG. 3E. The reference signal "f" is applied as a threshold level signal to the inverting input terminal of a comparator 58. The comparator 58 compares the sum signal "b" derived from the buffer 59 with the reference signal "f" from the level shift circuit 57. When the sum signal "b" is larger than the reference signal "f", the comparator 58 produces a timing signal "e" in a high level. When the signal "b" is smaller than the signal "f", it produces a timing signal "e" in a low level. The timing signal "e" is applied to the switch SW3 in the sample/hold circuit 52.

The linear motor controller 22 produces a linear motor drive signal in accordance with the track difference signal "a" in the tracking mode. In the coarse and fine modes, the same produces another linear motor drive signal in accordance with a speed control signal from the D/A converter 29 and a speed signal from the speed signal generator 29.

The linear motor controller 22 is made up of a subtracter 61, select switch SW5, and driver 62.

The track difference signal "a" from the subtracter 27 is supplied to a contact β of the switch SW5. A subtracter 29 subtracts a speed signal "c" from the speed signal generator 29 from a speed control signal from the D/A converter 39. The result of the subtraction by the subtracter 61 is supplied to a contact α of the switch SW5.

The on and off of the switch SW5 is under control of the CPU 38. In the tracking mode, the switch SW5 is turned to the contact β. In the coarse and fine modes, it is set to the contact α, and ω, respectively. The signal from the select switch SW5 is supplied to the driver 62. The driver energizes the drive coil 21a in accordance with the received signal.

The operation of the optical disk apparatus thus arranged will be described by using a flowchart shown in FIG. 6.

It is assumed now that at the time of reproduction or recording before an access is performed, the switch SW1 in the tracking controller 30 is turned on under control of the CPU 38, that the switch SW4 in the speed signal generator 29 is turned on by the CPU 38 and at this time the switch SW2 in the tracking controller 30 has been turned off, and that the switch SW5 in the linear motor controller 22 is set to the contact γ.

A track difference signal "c" from the subtracter 27 is supplied to the driver 44, through the switch SW1, buffer 41, phase corrector 42, and adder 43. The driver 44 drives the drive coil 4 in accordance with the signal "a", to effect a tracking.

At this time, the track difference signal "a" from the subtracter 27 is supplied to the driver 62 via the select switch SW5. The driver 62 energizes the drive coil 21a in accordance with the signal 2a and drives the linear motor 21. With the operation of the linear motor 21, the optical head 3 is moved and in the tracking mode, the position of the head 3 is also corrected.

The sum signal "b" from the adder 28 is supplied through the buffer 59 and the switch SW4 to the capacitor C2. The capacitor stores a high level signal when the laser beam is positioned above a track.

In such a tracking mode, the optical disk controller 37 transfers a signal representing a block number to be accessed to the CPU 38. Upon receipt of this, the CPU 38 computes a track number and a sector number that are to be accessed, by using a table (not shown) in the memory 71 (step ST1).

The CPU 38 determines the present position of a laser beam above a track on the disk 1 from the address data containing the track number and the sector number. When the present track coincides with a target track, the access is completed.

The CPU 38 computes a difference between the track number of the present track and that of the target track, and a moving direction (inward or outward of the disk 1) (step ST2). When the difference is several tens or more tracks, the coarse mode is selected. When it is less than that, the fine access mode is selected (step ST3).

In the coarse access mode, the CPU 38 turns off the switch SW1 in the tracking controller 30, to disconnect the tracking servo loop. At the same time, the switch SW4 in the speed signal generator 29 is turned off, and the switch SW5 in the linear controller 22 is turned to the contact α (step ST4).

In the speed signal generator 29, a track difference signal "a" from the subtracter 27 is converted into a speed signal "d" by the differentiating circuit 51, and is supplied to the switch SW3.

At this time, when the laser beam is above a track, the timing signal generator 53 applies a high level timing signal "e" to the switch SW3, and when it is between the tracks, the generator 53 applies a low level signal to the switch SW3.

When switch SW4 is turned off, a high level signal charged in the tracking mode is held by the capacitor C2. The signal stored in the capacitor C2 is level shifted by the level shift circuit 57. The level shifted signal (reference signal) "f" is applied to the comparator 58. The comparator 58 compares the sum signal "b" from the adder 28 and the reference signal "f" from the level shift circuit 57. When the signal "b" is higher than the signal "f", it produces a high level signal "e". In the reverse case, it produces a low level signal "e".

For the high level signal "e", the switch SW3 is turned on.

The speed signal "d" that is derived from the differentiating circuit 51 and represents the positioning of the laser beam above a track is sampled by the switch SW3 and held by the capacitor Cl. This signal "d" is exclusive of a speed signal representing the positioning of the laser beam between the tracks. The signal held in the capacitor Cl is applied as a true signal "c" to the subtracter 61 in the linear motor controller 22 (step ST5).

The CPU 38 reads out the speed control data corresponding to the number of tracks that the beam passed from the speed control table 71a in the memory 71, and sets in the subtracter 61 through the D/A converter 39 (step ST6). In the subtracter 61, the difference between the speed control signal from the D/A converter 61 and the exact speed signal from the speed signal generator 29 (a relative speed of the objective 6 to the optical disk 1) is calculated.

The subtraction result of the subtracter 61 is supplied via the switch SW5 to the driver 62. With the resultant signal, the driver 62 energizes the drive coil 21a, and moves the linear motor 22 and in turn the optical head 3 (step ST7).

Subsequently, every time a count of the track counter 32 is updated, viz., the number of the passed tracks is counted (step ST8), the speed control data read out from the speed control table 71a in the memory 71 is altered. By the altered speed control data, a moving speed of the optical head 3 is controlled.

When a count of the counter 32 reaches the number of passed tracks as computed in step ST2, the CPU 38 decides that the access is completed (step ST9). It turns on the switch SW1 in the tracking controller 30, making the track mode effective (step ST10). At the same time, the CPU 38 turns on the switch SW4 in the speed signal generator 29, and turns the switch SW5 in the linear motor controller 22 to the contact $\beta$ (step ST10).

In the coarse access mode, the moving speed of the laser beam, viz., a relative speed of the objective 6 (optical head 3) to the optical disk 1, can be exactly obtained. The linear motor 22 (optical head 3) is moved on the basis of the difference between the moving speed and the speed signal from the CPU 38. Therefore, an exact access is ensured regardless of a disturbance such as an eccentricity of the optical disk 1.

The track difference signal "a" and the sum signal "b" are formed by using the signal derived from the photo detector 8. Differentiating the track difference signal provides the signal "d" representing the relative moving speed of the objective 6 to the disk 1.

Changing a level of the sum signal "b" indicates that the laser beam is positioned above a track, and provides the reference signal "f". Digitizing the sum signal "b" by using the reference signal "f" provides the timing signal "e". By using the timing signal "e", the speed signal "d" resulting from differentiating the track difference signal "a" is sampled and held. The sampled and held signal is used as the true speed signal "c". Therefore, even if an eccentricity of the disk 1 exists, the relative moving speed of the objective 6 to the disk 1 can exactly be computed.

When the CPU 38 switches the optical disk apparatus into the fine access mode, the switch SW1 in the tracking controller 30 is turned off, and the tracking servo loop is disconnected (step ST11). At the same time, the CPU 38 turns on the switch SW2 in the tracking controller 30, turns off the switch SW4, and turns the switch SW5 to the contact $\omega$ (step ST11).

In the speed signal generator 29, the track difference signal "a" supplied from the subtracter 27 is converted into a speed signal "c", and is applied to the switch SW3.

The switch SW3 receives a high level timing signal "e" when the laser beam is above a track, and a low level signal when it is between the tracks.

As the result of turning off the SW4, a high level signal charged in the tracking mode is held by the capacitor C2. The signal stored in the capacitor C2 is level shifted by the level shift circuit 57. The level shifted signal (reference signal) "f" is applied to the comparator 58. The comparator 58 compares the sum signal "b" from the adder 28 and the reference signal "f" from the level shift circuit 57. When the signal "b" is higher than the signal "f", it produces a high level signal "e". In the reverse case, it produces a low level signal "e".

For the high level signal "e", the switch SW3 is turned on.

The speed signal "d" that is derived from the differentiating circuit 51 and represents the positioning of the laser beam above a track, is sampled by the switch SW3 and held by the capacitor C1. This signal "d" is exclusive of a speed signal representing the positioning of the laser beam between the tracks. The signal held in the capacitor C1 is applied as a true signal "c" to the subtracter 61 in the linear motor controller 22 (step ST12).

The CPU 38 reads out the speed control data corresponding to the number of tracks that the beam passed from the speed control table 71a in the memory 71 and sets in the subtracter 45 through the D/A Converter 39 (step ST13). In the subtracter 45, subtraction is applied to the speed control signal from the D/A converter 39 and the exact speed signal "c" from the speed signal generator 29 (a relative speed of the objective 6 to the optical disk 1).

The subtraction result of the subtracter 45 is supplied via the switch SW2 and the adder 43 to the driver 44. With the resultant signal, the driver 44 energizes the drive coil 44, and moves the objective 6 (step ST14).

Subsequently, every time a count of the track counter 32 is updated, viz., the number of the passed tracks is counted (step ST15), the speed control data read out from the speed control table 71a in the memory 71 is altered. By the altered speed control data, the moving speed of the objective 6 is controlled.

When a count of the counter 32 reaches the number of passed tracks as computed in step ST2, the CPU 38 decides that the access is completed (step ST16). It turns on the switch SW1 in the tracking controller 30, making the tracking mode effective (step ST17). At the same time, the CPU 38 turns on the switch SW2 in the tracking controller 30, and turns the switch SW4 in the speed signal generator 29, and turns the switch SW5 in the linear motor controller 22 to the contact $\beta$ (step ST10).

In the fine access mode, the moving speed of the laser beam, viz., a relative speed of the objective 6 to the optical disk 1, can exactly be obtained. The objective 6 is moved on the basis of the difference between the moving speed and the speed signal from the CPU 38. Therefore, an exact access is ensured regardless of a disturbance such as an eccentricity of the optical disk 1.

What is claimed is:

1. an optical disk apparatus comprising:
   focus means for focusing a laser beam onto an optical disk having tracks thereon;
   laser beam detecting means for detecting a laser beam reflected from said tracks of said optical disk and generating a detection signal;
   moving means for moving said focusing means in a direction orthogonal to the axis of the laser beam;
   tracking error signal generating means for generating a tracking error signal in accordance with the detection signal generated by said detecting means;
   driving means responding to the tracking error signal to generate a signal used by said moving means to move said focusing means so that the laser beam traces a target track on said optical disk;
   differentiating means for differentiating the tracking error signal from said tracking error generating means;
   timing signal generating means for generating a timing signal in accordance with a position of the laser beam crossing the tracks;
   means for sampling and holding the differentiated signal from said differentiating means in response to the timing signal from said timing signal generating means, and outputting a signal representative of the relative speed of said optical disk and said focusing means;
   processing means for calculating a position difference signal corresponding to the position difference between a target track and the track where said laser beam is currently applied;
   memory means for storing various speed control data corresponding to then number of tracks to be crossed by said laser beam to place the laser beam at the target track and outputting a predetermined speed control data in response to the position difference signal; and
   means for deenergizing said driving means when said processing means is energized and driving said moving means to move said focusing means and access the target track with said laser beam in response to a laser beam movement signal, a speed control data signal, the signal output from said sampling and holding means and the speed control data output from said memory means.

2. The optical disk apparatus according to claim 1, wherein said timing signal generating means includes a sample/hold circuit, a level shift circuit, and a comparator.

3. an optical disk apparatus comprising:
   an optical head including focusing means for focusing a laser beam onto an optical disk having tracks thereon, and laser beam detecting means for detecting a laser beam reflected from said tracks of said optical disk and generating a detection signal;
   first moving means for moving said focusing means in a direction orthogonal to the axis of the laser beam;
   second moving means for moving said optical head in the radial direction of said optical disk;
   tracking error signal generating means for generating a tracking error signal in accordance with the detection signal from said detecting means;
   driving means responding to the tracking error signal to generate a signal used by the first moving means to move said focusing means so that the laser beam traces a target on said optical disk;
   differentiating means for differentiating the tracking error signal from said tracking error generating means;
   timing signal generating means for generating a timing signal in accordance with a position of the laser beam crossing the tracks;
   means for sampling and holding the differentiated signal from said differentiating means in response to the timing signal from said timing signal generating means, and outputting a signal representative of the relative speed of said optical disk and said focusing means;
   processing means for calculating a position difference signal corresponding to the position difference between a target track and the track where said laser beam is currently applied;
   memory means for storing various speed control data corresponding to the number of tracks to be traced by said laser beam to place the laser beam at the target track and outputting a predetermined speed control data in response to the position difference signal; and
   means for deenergizing said driving means, when said processing means is energized and driving said second moving means to move said optical head to the target track in response to the signal output from said sampling and holding means and the speed control output from said memory means.

4. The optical disk apparatus according to claim 3, wherein said timing signal generating means includes a sample/hold circuit, a level shift circuit, and a comparator.

5. An optical disk apparatus comprising:
   focusing means for focusing a laser beam onto an optical disk having tracks thereon;
   laser beam detecting means for detecting a laser beam reflecting from said tracks of said optical disk and generating a detection signal;
   moving means for moving said focusing means in a direction orthogonal to the axis of the laser beam;
   first generating means for generating a tracking error signal in accordance with the detecting signal from said laser beam detecting means;
   second generating means responsive to the detection signal from said laser beam detection means for generating a high level signal when the laser beam is positioned above a track on said optical disk, and for generating a low level signal when the laser beam is positioned between the adjacent tracks on said optical disk;
   differentiating means for differentiating the tracking error signal from said first generating means;
   timing signal generating means for generating a timing signal using the output signal from said second generating means;
   means for sampling and holding the differential signal from said differentiating means in response to the timing signal from said timing signal generating means, and outputting a signal representative of the relative speed of said the optical disk and said focusing means.

6. The optical disk apparatus according to claim 5, wherein said timing signal generating means includes a sample and hold circuit, a level shift circuit, and a comparator.

7. The optical disk apparatus according to claim 1, wherein said timing signal generating means comprises a sample/hold circuit for sampling and holding the signal generated from said laser beam detecting means, a level shift circuit for level-shifting a signal from said sample/hold circuit, and a comparison circuit for comparing a signal from said level shift circuit with the signal from said laser beam detecting means, and outputting a high level signal when the level of the signal from said laser beam detecting means is higher than that of the signal from said level shift circuit, and outputting a low level signal when the level of the former is lower than that of the latter.

8. The optical disk apparatus according to claim 3, wherein said timing signal generating means comprises a sample/hold circuit for sampling and holding the signal generated from said laser beam detecting means, a level shift circuit for level-shifting a signal from said sample/hold circuit, and a comparison circuit for comparing a signal from said level shift circuit with the signal from said laser beam detecting means, and outputting a high level signal when the level of the signal from said laser beam detecting means is higher than that of the signal from said level shift circuit, and outputting a low level signal when the level of the former is lower than that of the latter.

9. The optical disk apparatus according to claim 5, wherein said timing signal generating means comprises a sample/hold circuit for sampling and holding the signal generated from said second generating means, a level shift circuit for level-shifting a signal from said sample/hold circuit, and a comparison circuit for comparing a signal from said level shift circuit with the signal from said second generating means, and outputting a high level signal when the level of the signal from said second generating means is higher than that of the signal from said level shift circuit, and outputting a low level signal when the level of the former is lower than that of the latter.

* * * * *